United States Patent
Shen et al.

(10) Patent No.: US 9,634,576 B2
(45) Date of Patent: Apr. 25, 2017

(54) SYSTEM AND METHOD FOR UNIFIED COMMON MODE VOLTAGE INJECTION

(71) Applicant: General Electric Company, Schenectady, NY (US)

(72) Inventors: Jie Shen, Garching b. Munich (DE); Stefan Schroeder, Munich (DE); Kunlun Chen, ShangHai (CN); Shuitao Yang, ShangHai (CN); Bo Qu, ShangHai (CN); Qin Lei, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 362 days.

(21) Appl. No.: 14/317,361

(22) Filed: Jun. 27, 2014

(65) Prior Publication Data

US 2015/0008750 A1    Jan. 8, 2015

(30) Foreign Application Priority Data

Jul. 3, 2013    (CN) .......................... 2013 1 0276169

(51) Int. Cl.
*H02M 7/487*    (2007.01)
*H02M 7/483*    (2007.01)
*H02M 1/12*    (2006.01)

(52) U.S. Cl.
CPC ........... *H02M 7/487* (2013.01); *H02M 7/483* (2013.01); *H02M 1/12* (2013.01); *H02M 2001/123* (2013.01); *Y10T 307/707* (2015.04)

(58) Field of Classification Search
CPC ........ H02M 7/487; H02M 7/483; H02M 1/12; H02M 2001/123
See application file for complete search history.

(56) References Cited

U.S. PATENT DOCUMENTS 6,621,719 B2    9/2003 Steimer et al.
7,573,732 B2    8/2009 Teichmann et al.
(Continued)

FOREIGN PATENT DOCUMENTS

EP    2597768 A2    5/2013

OTHER PUBLICATIONS

Tallam et al., "A Carrier-Based PWM Scheme for Neutral-Point Voltage Balancing in Three-Level Inverters", IEEE Transactions on Industry Applications, vol. No. 41, Issue No. 6, pp. 1734-1743, 2005.

(Continued)

*Primary Examiner* — Fred E Finch, III
*Assistant Examiner* — Rafael O De Leon Domenech
(74) *Attorney, Agent, or Firm* — GE Global Patent Operation; Scott R. Stanley

(57) ABSTRACT

A power conversion system includes at least one multi-level power converter and a controller coupled to the at least one multi-level power converter. The controller includes a first CMV injection module and a second CMV injection module. The first CMV injection module generates a first CMV signal for modifying at least one voltage command to achieve a first function in association with operation of the power conversion system. The second CMV injection module generates a second CMV signal based at least in part on a local limit either for modifying the at least one voltage command or for further modifying the at least one modified voltage command to achieve a second function in association with operation of the power conversion system.

20 Claims, 11 Drawing Sheets

(56) References Cited

U.S. PATENT DOCUMENTS

| | | |
|---|---|---|
| 7,760,527 B2 | 7/2010 | Baudesson et al. |
| 7,920,393 B2 | 4/2011 | Bendre et al. |
| 7,952,896 B2 | 5/2011 | Hu et al. |
| 8,319,466 B2 | 11/2012 | Valdez et al. |
| 8,374,810 B2 | 2/2013 | Angquist |
| 2011/0141786 A1 | 6/2011 | Shen et al. |
| 2013/0027995 A1 | 1/2013 | Harnefors et al. |
| 2013/0044526 A1 | 2/2013 | Soua |

OTHER PUBLICATIONS

Unofficial English Translation of Chinese Office Action issued in connection with corresponding CN Application No. 201310276169.5 on May 18, 2016.

Tallam et al., "A Carrier-Based PWM Scheme for Neutral-Point Voltage Balancing in Three-Level Inverters", IEEE Applied Power Electronics Conference and Exposition, vol. No. 03, pp. 1675-1681, Feb. 22, 2004.

European Search Report and Opinion issued in connection with corresponding EP Application No. 14175253.5 on Dec. 18, 2014.

Vasiladiotis et al., "Accurate Voltage Ripple Estimation and Decoupled Current Control for Modular Multilevel Converters", Power Electronics and Motion Control Conference (EPE/PEMC), 2012 15th International, Issue Date: Sep. 4-6, 2012, pp. LS1a-1.2-1-LS1a-1.2-8, Print ISBN: 978-1-4673-1970-6.

Shen et al., "A Neutral Point Balancing Controller for Three-Level Inverter with Full Power-Factor Range and Low Distortion", IEEE, 2011, pp. 3419-3426, ISBN: 978-1-4577-0541-01/11.

SYSTEM AND METHOD FOR UNIFIED COMMON MODE VOLTAGE INJECTION

BACKGROUND

Embodiments of the disclosure relate generally to systems and methods of unified common mode voltage injection to achieve multiple functions.

Power converters, particularly multi-level power converters, are increasingly used for performing power conversion in a wide range of applications due to the advantages of high power quality waveform and high voltage capability. For example, multi-level power converters may be used for performing DC-to-AC power conversion to supply single-phase or multi-phase AC voltages to electric motors in vehicles and/or pumps. Multi-level converters may also be used in power generation systems such as wind turbine generators and solar generators for performing DC-to-AC power conversion to supply single-phase or multi-phase AC voltages for power grid transmission and distribution.

Typically, the power converters are designed to regulate or control various characteristic parameters in association with the operation of the power converters to meet certain requirements and/or ensure reliable operations. For example, the output AC voltage and/or current provided from the power converters may be controlled to have a low total harmonic distortion (THD) since high-order harmonic signals may degrade the quality of power delivered to the power grid or may cause damage to the electric motors. In addition, a DC link consisting of at least two DC capacitors is controlled to minimize the voltage difference between the two DC capacitors to avoid stressing the switching devices and/or creation of undesired harmonic signals. However, to achieve the purposes of controlling the various characteristic parameters, the conventional system typically employs different control strategies, such as carrier phase-shifting for reducing the output THD and space-vector switching state selection for balancing the DC voltages at the DC link.

BRIEF DESCRIPTION

Embodiments of the present invention are directed to a simplified or unified control solution wherein regulating one characteristic parameter may contribute to an appropriate control of at least two other characteristic parameters.

In accordance with one aspect of the present disclosure, a power conversion system is provided. The power conversion system includes at least one multi-level power converter and a controller coupled to the at least one multi-level power converter. The controller includes a first common mode voltage (CMV) injection module and a second CMV injection module. The first CMV injection module is for generating a first CMV signal for modifying at least one voltage command to achieve a first function in association with operation of the power conversion system. The second CMV injection module is for generating a second CMV signal based at least in part on a local limit either for modifying the at least one voltage command or for further modifying the at least one modified voltage command to achieve a second function in association with operation of the power conversion system.

In accordance with another aspect of the present disclosure, a method for operating a power conversion system having a multi-level converter and a controller coupled thereto is provided. The method includes: generating a first common mode voltage (CMV) injection signal; using the first CMV signal to modify at least one voltage command to achieve a first function in association with operation of the power conversion system; generating a second CMV signal based at least in part on a local limit; and using the second CMV signal either to modify the at least one voltage command or to further modify the at least one modified voltage command to achieve a second control function in association with operation of the power conversion system.

In accordance with another aspect of the present disclosure, another power conversion system is provided. The power conversion system includes a direct current (DC) link, at least one multi-level power converter, and a controller. The DC link includes at least a first DC part and a second DC part defining a neutral point therebetween. The at least one multi-level power converter is coupled to the DC link. The controller is coupled to the at least one multi-level power converter and includes a common mode voltage (CMV) injection module configured for generating a CMV signal for modifying at least one voltage command to balance DC voltages at the first DC part and the second DC part. The CMV injection module provides at least one of a maximum and minimum CMV limit signal for limiting the magnitude of the CMV signal based at least in part on a local limit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
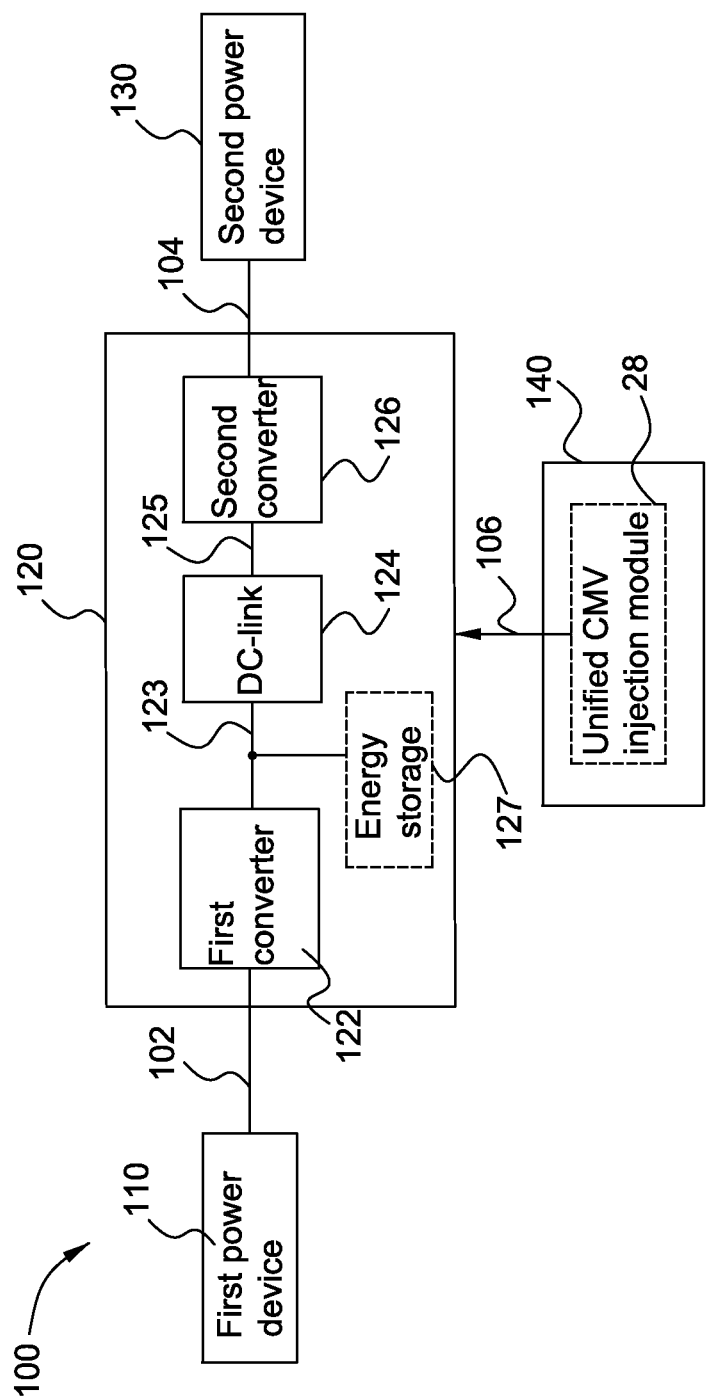
FIG. 1 is a block diagram of a power conversion system configured to implement a unified common mode voltage injection algorithm/method in accordance with an exemplary embodiment of the present disclosure.

Embodiments disclosed herein generally relate to a unified common mode voltage (CMV) injection algorithm/method and a power conversion system that can be configured to implement the unified CMV injection algorithm/method to achieve multiple purposes or functions in association with the operation of the power conversion system. More specifically, the unified CMV injection algorithm/method may be implemented to inject a first CMV signal which is used to modify at least one command signal or modulation signal such as three-phase voltage commands to achieve a first function in association with the operation of the power conversion system. In one embodiment, the first function may be increasing the DC voltage utilization or reducing the total harmonic distortion (THD) which may be achieved by injecting the first CMV signal generated through a min-max calculation. In the min-max calculation, the first CMV signal is generated according to an instantaneous maximum voltage and an instantaneous minimum voltage identified from a plurality of voltage signals such as three-phase voltage signals. In other embodiments, the first CMV signal may be generated by injecting a pure third-order harmonic signal which has a three times fundamental frequency. In some embodiments, to achieve minimum output THD, the first CMV signal may be injected in a particular manner to ensure the modified command signal or the modified modulation signal to be far away from the edges of the carrier band. In some embodiments, to further reduce the switching loss in operating the switching devices of the power converter, the first CMV signal may be generated in a particular manner to provide a flattop modulation. Flattop modulation refers to maintaining the gate signals of at least one phase unchanged either at the "0" state or "1" state for a sufficiently long time.

In addition, the unified CMV injection algorithm/method may be implemented to inject a second CMV signal. This second CMV signal is used to either modify the at least one command or modulation signal prior to the modification by the first CMV signal or to further modify the already modified CMV signal by the first CMV signal to achieve at least a second function in association with the operation of the power conversion system. In some embodiments, the second function may be neutral point current regulation or DC link voltage balancing. More specifically, in one embodiment, the second CMV signal may be injected to regulate a DC current flowing to or from the neutral point at the DC link to make the voltage difference at the DC link substantially zero over one or more control cycles. In another embodiment, the second CMV signal may be injected to regulate an AC current flowing to or from the neutral point at the DC link to make the voltage difference at the DC link substantially zero over one or more control cycles. In some embodiments, the second CMV signal may be injected in a particular manner to ensure the gate signals generated through PWM modulation have a minimal pulse width without creating voltage-second distortion at the output of the power converter. In some particular applications, such as for five-level or higher-level power converters, the second CMV signal may be injected by selectively using the redundant switching states to reduce voltage stress at the flying capacitors. In some embodiments, the second CMV signal is injected to have a minimal magnitude to avoid the creation of undesired THD, but create the same effect of neutral point current regulation or DC voltage balancing.

In some embodiments, during generation of the second CMV signal, at least one global limit is taken into consideration. More specifically, in one embodiment, the at least one global limit includes one or more DC link voltages. The magnitude of the second CMV signal is particularly generated so that one or more modified modulation voltage signals will not exceed a voltage range defined by an upper DC link voltage and a lower DC link voltage. Further, in some embodiments, the magnitude of the second CMV signal is particularly generated to ensure either the maximum modulation/voltage signal or a minimum modulation/voltage signal modified by the second CMV signal is not crossing zero. In some embodiments, at least one local limit is taken into consideration in generating the second CMV signal. More specifically, the magnitude of the second CMV signal is particularly generated so that, at any instant, the one or more modulation voltage signals falling within one carrier band voltage before CMV injection will not jump into another different carrier band voltage after CMV injection.

Implementing the unified CMV injection algorithm/method can achieve a variety of technical advantages and/or benefits. One technical advantage or benefit is the DC voltages of the DC link can be balanced at any power factor. Another technical advantage or benefit is the CM voltage seen from the load can be minimized. Yet another technical advantage or benefit in association with injecting CMV signals by considering one or more local limits is avoiding additional switching patterns and/or transients, reducing control complexity as well as reducing the switching loss by restricting the modulation signals after CMV injection within their carrier band voltages. Other technical advantages or benefits will become apparent to those skilled in the art by referring to the detailed descriptions and accompanying drawings provided below in accordance with one or more embodiments of the present disclosure.

In an effort to provide a concise description of these embodiments, not all features of an actual implementation are described in the one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and may be optionally be connected or otherwise coupled together to provide the described function.

FIG. 1 illustrates a block diagram of a power conversion system 100 in accordance with an exemplary embodiment of the present disclosure. The power conversion system 100 may be any appropriate converter-based system that can be configured to implement the unified common mode voltage injection algorithm/method as disclosed herein. In some embodiments, the power conversion system 100 may be a multi-level converter-based system suitable for high power and high voltage applications.

As illustrated in FIG. 1, the power conversion system 100 includes a power conversion device 120 and a control device 140 coupled in communication with the power conversion device 120. In one embodiment, the control device 140 is arranged to be in communication with the power conversion device 120 and may transmit control signals 106 to the power conversion device 120 via one or more electrical links or wires for example. In another embodiment, the control device 140 may be in optical communication with the power conversion device 120 and can transmit the control signals 106 to the power conversion device 120 via an optical communication link, such as one or more optical fibers for example. In another embodiment, the control device 140 may be embedded within the power conversion device 120. The control device 140 may include any suitable programmable circuits or devices such as a digital signal processor (DSP), a field programmable gate array (FPGA), a programmable logic controller (PLC), and an application specific integrated circuit (ASIC). The power conversion device 120 can be operated to perform unidirectional or bidirectional power conversion between a first power device 110 and a second power device 130 in response to the control signals 106 transmitted from the control device 140.

In one embodiment, as shown in FIG. 1, the power conversion device 120 may include a first converter 122, a DC link 124, and a second converter 126. In one embodiment, the first converter 122 may be an AC-DC converter (also known as rectifier) which is configured to convert first electric power 102 (e.g., first AC electric power) provided from the first power device 110 (e.g., power grid) into DC electric power 123 (e.g., DC voltage). In one embodiment, the DC-link 124 may include one or more capacitors coupled in series and/or in parallel. The DC-link 124 is configured to remove ripples from first DC voltage 123 and supply second DC voltage 125 to the second converter 126. In one embodiment, the second converter 126 may be a DC-AC converter (also known as inverter) which is configured to convert the second DC voltage 125 into a second AC voltage 104, and supply the second AC voltage 104 to the second power device 130 (e.g., AC electric motor) or to a power network such as a load and/or utility grid (not shown). Although not illustrated in FIG. 1, in some embodiments, the power conversion system 100 may include one or more other devices and components. For example, one or more filters and/or circuit breakers can be placed between the first power device 110 and the power conversion device 120. Also, one or more filters and/or circuit breakers can be placed between the power conversion device 120 and the second power device 130.

The power conversion system 100 illustrated in FIG. 1 can be used in a variety of applications, for example, in a motor drive for driving motors such as AC motors. The power conversion system 100 can also be used in wind power generation systems, solar/photovoltaic power generation systems, hydropower generation systems, and any combinations thereof. In some other embodiments, the power conversion system 100 may also be used in areas that are desirable to use uninterruptible/uninterrupted power system (UPS) for maintaining continuous power supply. In one embodiment, the first converter 122 may be an AC-DC converter which is configured to convert first AC electric power provided from the first power device 110 (e.g., power grid) into DC electric power. The power conversion system 100 may also include an energy storage device 127 which is configured to receive and store the DC electric power provided from the first converter 122. In one embodiment, the second converter 126 may be a DC-AC converter which is configured to convert the DC electric power provided from the first converter 122 or DC electric power obtained from the energy storage device 127 into second AC electric power, and supply the second AC electric power to the second power device 130 (e.g., a load).

As illustrated in FIG. 1, the control device 140 of the power conversion system 100 may include a unified CMV injection module 28 which can be implemented as software, hardware or a combination thereof to achieve multiple functions in association with the operation of the power conversion system 100. More specifically, the unified CMV injection module 28 can be implemented to inject a first CMV signal which is used to modify one or more command signals or modulation signals such as three-phase AC voltage commands to achieve at least one first function such as increasing DC voltage utilization, reducing total harmonic distortion at the output of the second converter 126, as well as reducing switching loss in association with operating the switching devices in the second converter 126. In addition, the unified CMV injection module 28 may be implemented to inject a second CMV signal which is used to either modify the one or more command signals or modulation signals or further modify the modified one or more command signals or modulation signals to achieve at least one second function such as balancing DC voltages at the DC link 124, limiting minimum pulse width of gating signals, as well as reducing voltage stress at flying capacitors, etc. Detailed description of the unified CMV injection module 28 will be provided below with reference to FIGS. 6-11.

Figure 2:
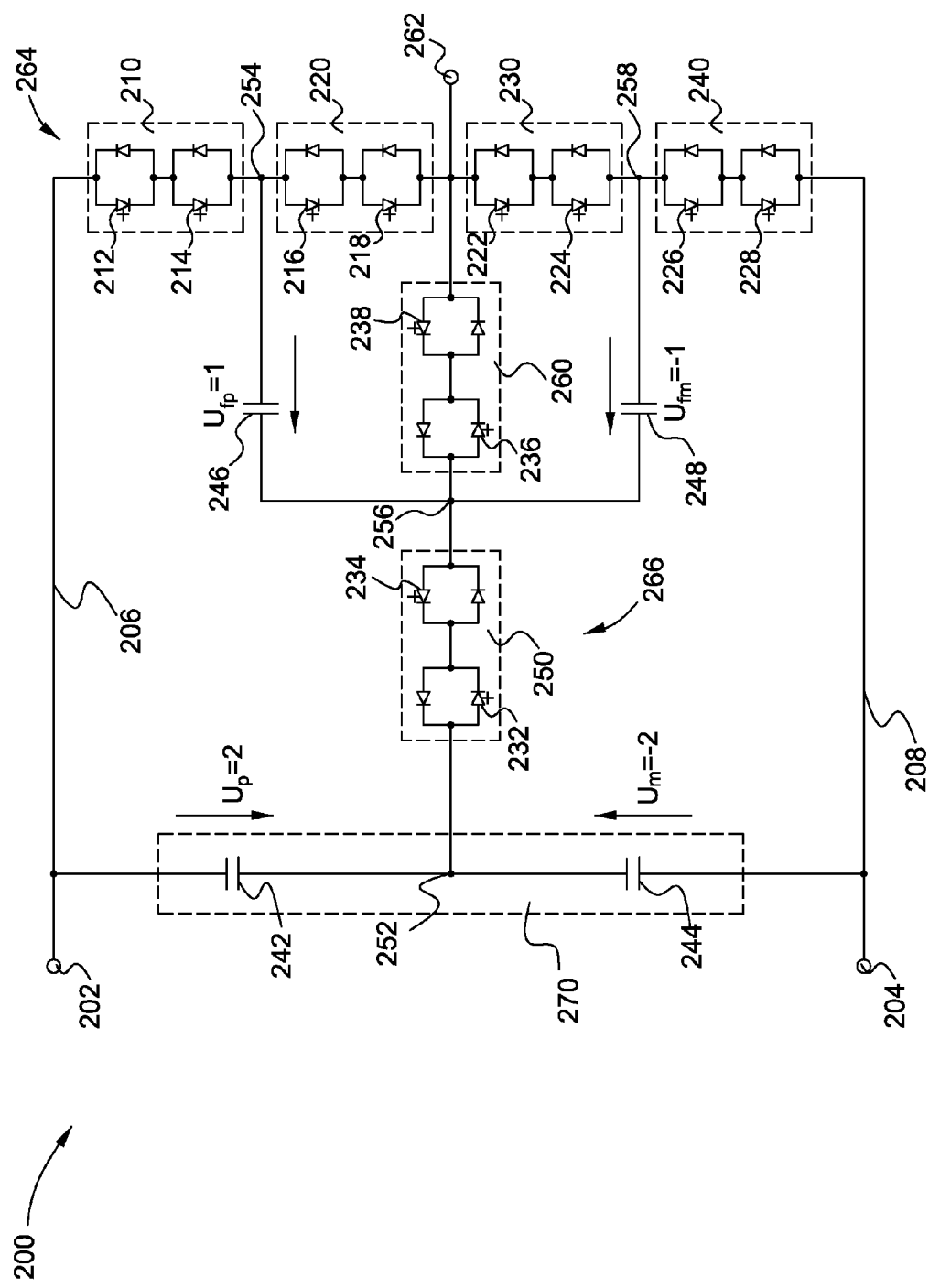
FIG. 2 is a detailed circuit diagram of a converter having a nested neutral point piloted configuration that may be used in the power conversion system shown in FIG. 1 in accordance with an exemplary embodiment of the present disclosure.

FIG. 2 illustrates one potential topology that may be used to implement the unified CMV injection module 28 shown in FIG. 1 to achieve various functions in association with the operation of the power conversion system 100. More specifically, FIG. 2 illustrates a detailed circuit diagram of a single-phase power converter 200 which is particularly arranged to have a nested neutral point piloted (NPP) topology. In a particular configuration, the power converter 200 is arranged to provide a five-level output. In other embodiments, the power converter 200 can be arranged in similar manners to provide 2n−1 level output, and n is equal to or greater than three. The single-phase power converter 200 may be implemented as one phase of the second power converter or inverter 126 shown in FIG. 1 for converting DC voltages into AC voltages. The single-phase power converter 200 can also be implemented as one phase of the first converter or rectifier 122 shown in FIG. 1 for converting AC voltages into DC voltages.

As illustrated in FIG. 2, the single-phase power converter 200 includes four switch units 210, 220, 230, 240 coupled in series to form a longitudinal arm 264. In the exemplary embodiment, each of the four switch units 210, 220, 230, 240 includes two switching devices connected in a head-to-tail manner such that low-voltage rating semiconductor switching devices can be used to substantially equally share the voltage applied from a positive rail 206 and a negative rail 208. The positive rail 206 and the negative rail 208 are electrically coupled to a first port 202 and a second port 204, respectively, for receiving input voltage from a power source (not shown). More specifically, an emitter terminal of a first switching device 212 is connected to a collector terminal of a second switching device 214. In other embodiments, each of switch units 210, 220, 230, 240 may include any number of series-connected switching devices according to practical requirements.

The single-phase power converter 200 also includes two switch units 250, 260 coupled in series to form a transverse arm 266. Each of the two switch units 250, 260 includes two switching devices connected in series in a head-to-head or back-to-back manner. For example, two switching devices 236, 238 have their emitter terminals connected together, and another two switching devices 232, 234 have their collector terminals connected together. In addition, each of the switching devices 232, 234, 236, 238 in the two switch units 250, 260 can be substituted with more than two series-connected switching devices to allow the use of low-voltage rating switching devices in the transverse arm 266.

Further referring to FIG. 2, the single-phase converter 200 is coupled to a DC link 270 via the positive rail 206 and the negative rail 208. In the exemplary embodiment, the DC link 270 includes a first capacitor 242 and a second capacitor 244 coupled in series between the positive rail 206 and the negative rail 208. The first and second capacitors 206, 208 are commonly connected to define a neutral point or middle point 252 which is further connected to one terminal of the traverse arm 266. As will be described with more details below, the voltage at the neutral point or middle point 252 can be controlled by implementing the proposed unified CMV injection algorithm/method to at least achieve the function of DC link voltage balancing. The single phase converter 200 also includes a first flying capacitor 246 and a second flying capacitor 248. One terminal of the first flying capacitor 246 is connected to a joint connection 254 defined between the first switch unit 210 and the second switch unit 220, and the other terminal of the first flying capacitor 246 is connected to a joint connection 256 defined between the two switch units 250, 260. One terminal of the second flying capacitor 248 is connected to the joint connection 256, and the other terminal of the second flying capacitor 248 is connected to a joint connection 258 defined between the third switch unit 230 and the fourth switch unit 240. As will be described with more detail below, the voltages at the first and second flying capacitors 246, 248 also can be controlled or balanced by implementing the proposed unified CMV injection algorithm/method.

During operation, the plurality of the switching devices in the longitudinal arm 264 and traverse arm 266 can be selectively turned on and off in a predefined switching pattern to provide different levels at the output terminal 262, for example, "2," "1," "0," "−1," "0," each of which may correspond to a different output voltage level. For example, when the single phase power converter 200 is desired to provide a "2" level output voltage, the switching devices 212, 214, 216, 218, 232, 236 are turned on, and the switching devices 222, 224, 226, 228, 234, 238 are turned off. Thus, current flows along a path formed by positive rail 206, switching devices 212, 214, 216, 218, and arrives at the output terminal 262. There are two options when the single-phase power converter 200 is desired to provide a "1" level output voltage at the output terminal 258. One option is turning on the switching devices 212, 214, 234, 236, while turning off the switching devices 212, 214, 232, 238, 222, 224, 226, 228. In this case, current flows along a path formed by the positive rail 206, the two switching devices 212, 214, the first flying capacitor 246, the switching device 236, an anti-parallel diode in association with the switching device 238, and arrives at the output terminal 262. Another option is turning on the switching devices 216, 218, 232, 234, while turning off the switching devices 222, 224, 226, 228. Thus, current can flow along a path formed by an anti-parallel diode in association with the switching device 232, switching device 234, the first flying capacitor 246, the two switching devices 216, 218, and arrive at the output terminal 262. Due to the current path or switching pattern redundancy, the various switching devices of the single-phase converter 200 can be strategically controlled to charge or discharge the first and second flying capacitors 246, 248 for balancing purposes.

Figure 3:
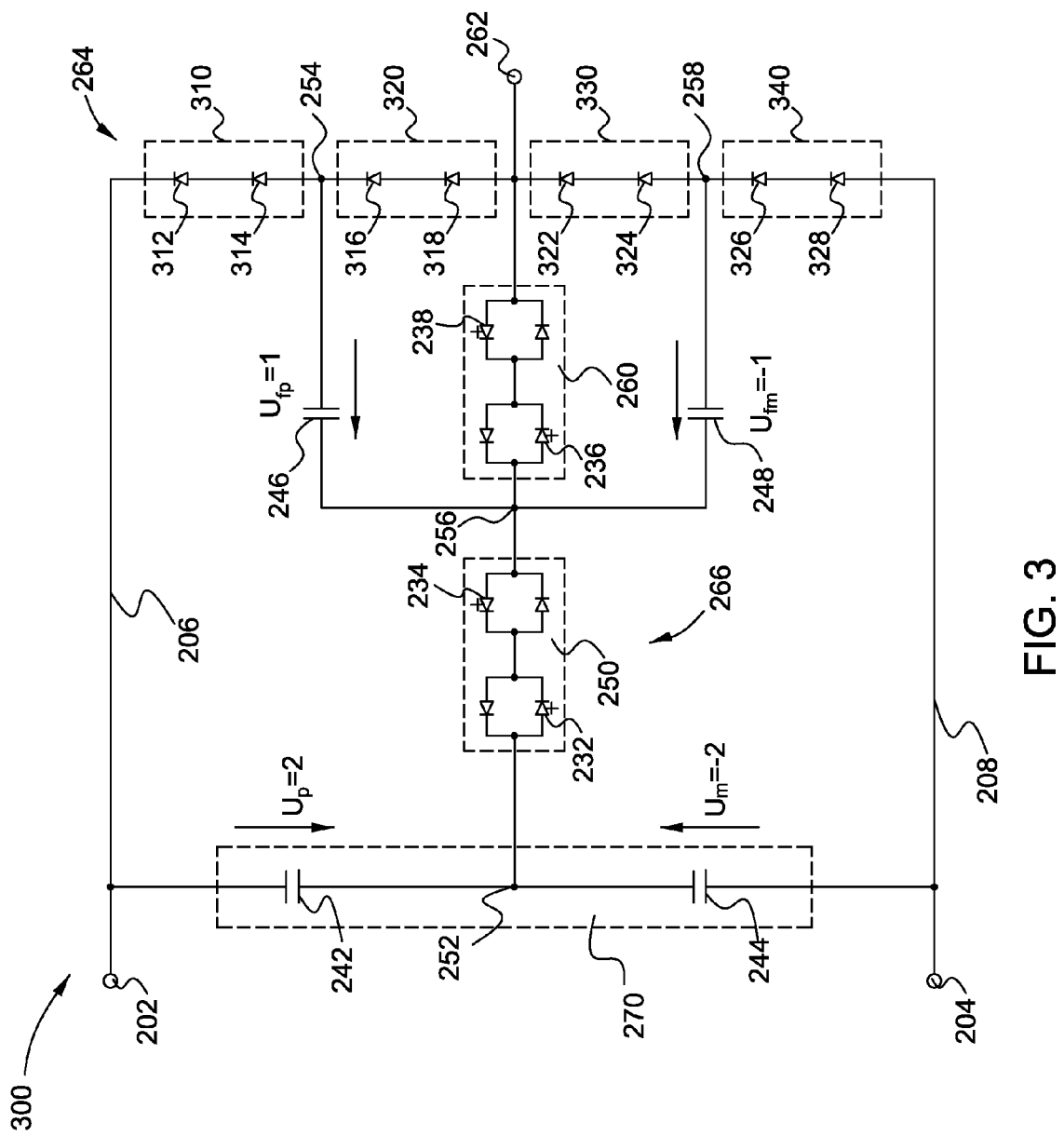
FIG. 3 is a detailed circuit diagram of a converter having another nested neutral point piloted configuration that may be used in the power conversion system shown in FIG. 1 in accordance with another exemplary embodiment of the present disclosure.

FIG. 3 illustrates a detailed circuit diagram of another single-phase converter 300 that may be used in the power conversion device 120 shown in FIG. 1 in accordance with an exemplary embodiment of the present disclosure. In a particular configuration, the single-phase converter 300 can be implemented as the first converter or rectifier 122 for converting AC voltages into DC voltages. The single-phase converter 300 shown in FIG. 3 is substantially the same as the single-phase converter 200 shown in FIG. 2, thus similar elements will not be described in detail herein. One difference of the single-phase converter 300 is that each of the four switch units 310, 320, 330, 340 employs two passive or uncontrollable devices such as diodes coupled in series to replace the controllable switching devices as those shown in FIG. 2.

More specifically, in the embodiment of FIG. 3, the first switch unit 310 includes two diodes 312, 314 coupled in series, the second switch unit 320 includes two diodes 316, 318 coupled in series, the third switch unit 330 includes two diodes 322, 324 coupled in series, and the fourth switch unit 340 includes two diodes 326, 328 coupled in series. In other embodiments, any number of diodes can be coupled in series in each of switch units 310, 320, 330, 340 to share the DC voltages.

Figures 4, 5:
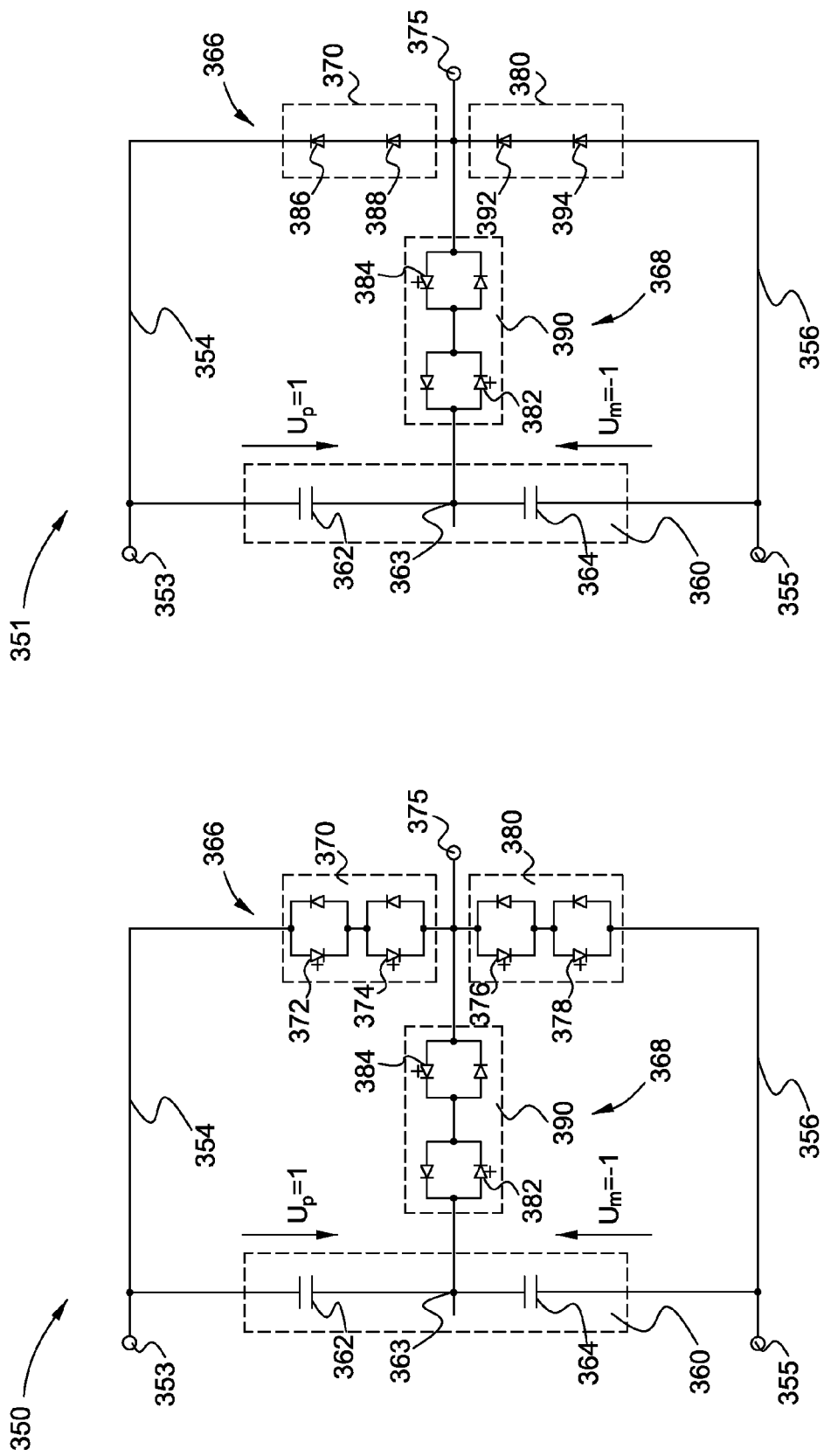
FIG. 4 is a detailed circuit diagram of a converter having another nested neutral point piloted configuration that may be used in the power conversion system shown in FIG. 1 in accordance with another exemplary embodiment of the present disclosure.
FIG. 5 is a detailed circuit diagram of a converter having another nested neutral point piloted configuration that may be used in the power conversion system shown in FIG. 1 in accordance with another exemplary embodiment of the present disclosure.

FIG. 4 illustrates a detailed circuit diagram of a three-level nested NPP power converter 350 that may be used in the power conversion system shown in FIG. 1 in accordance with one embodiment of the present disclosure. The three-level power converter 350 can be controlled by implementation of the proposed unified CMV injection algorithm and/or method as will be disclosed in more detail below. As shown in FIG. 4, the three-level power converter 350 may include a DC link 360 consisting of a first capacitor 362 and a second capacitor 364. The first and second capacitors 362, 364 are connected together to form a neutral or middle point 363. The three-level power converter 350 also includes a longitudinal arm 366 and a traverse arm 364. The longitudinal arm 366 is formed by connecting a first switch unit 370 and a second switch unit 380 in series between a positive rail 354 and a negative rail 356. In the illustrated embodiment, the first switch unit 370 includes series-connected a first switching device 372 and a second switching device 374, and the second switch unit 380 includes series-connected a third switching device 376 and a fourth switching device 378. In other embodiments, the first and second switch units 370, 380 may include more than two switching devices according to practical requirements. In the illustrated embodiment, the traverse arm 368 includes a switch unit 390 which includes a fifth switching device 382 and a sixth switching device 384, which are connected in a back-to-back manner between the neutral point 363 and an output port 375. During operation, the various switching devices 372, 374, 376, 378, 382, 384 are switched on and/off in a predefined switching pattern to allow DC voltage received at two input ports 353, 355 to be converted to AC voltage at the output port 375.

FIG. 5 illustrated a detailed circuit diagram of a three-level nested NPP power converter 351 that may be used in the power conversion system shown in FIG. 1 in accordance with another embodiment of the present disclosure. The three-level power converter 351 can also be controlled by implementation of the proposed unified CMV injection algorithm and/or method as will be disclosed in more detail below. The three-level power converter 351 shown in FIG. 5 is substantially similar to the three-level power converter 350 shown in FIG. 4. One difference of the three-level power converter 351 is that in the first switch unit 370 includes two passive or uncontrollable switching devices (e.g., diodes) 386, 388, and the second switch unit 380 includes two passive or uncontrollable switching devices (e.g., diodes) 392, 394. In other embodiments, the first and second switch unit 370, 380 may include more than two passive or uncontrollable switching devices.

It should be understood that the multi-level nested NPP topology shown in FIGS. 2-5 are just for illustrative purposes to facilitate explanation of the unified CMV injection algorithm/method and that the principles disclosed herein can be extended to other multi-level converters, including but not limited to, neutral point clamped topology, active neutral-point clamped topology, etc.

Figure 6:
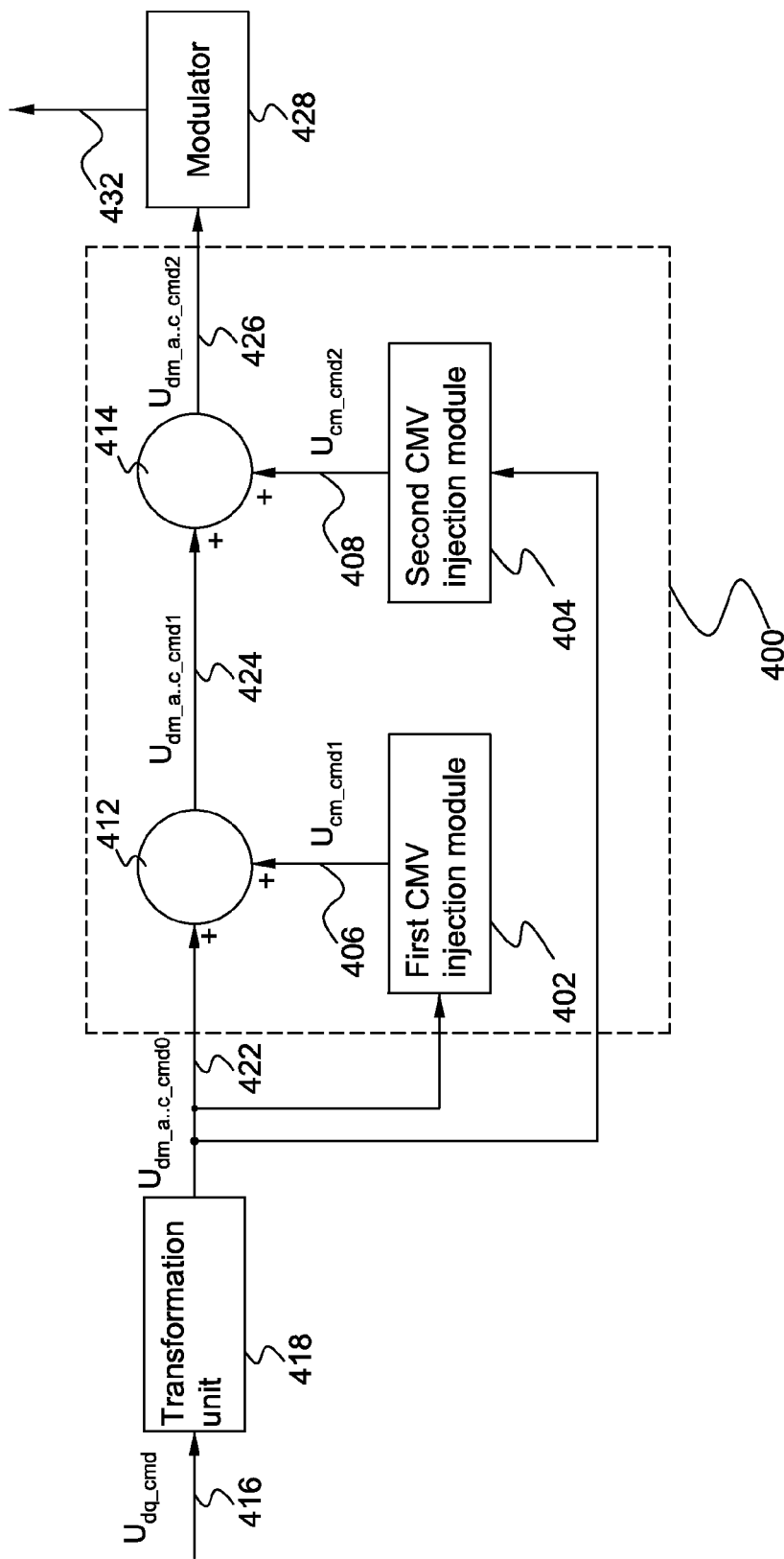
FIG. 6 is a block diagram of an unified common mode voltage injection module in accordance with an exemplary embodiment of the present disclosure.

FIG. 6 illustrates a block diagram of a unified common mode voltage (CMV) injection module 400 that may be implemented by the control device 140 shown in FIG. 1 to achieve multiple functions in association with the operation of the power conversion system 100. As illustrated in FIG. 6, the unified CMV injection module 400 includes a first CMV injection module 402 and a second CMV injection module 404. In other embodiments, the unified CMV injection module 400 may include more than two CMV injection modules. Still in some embodiments, it is possible to implement the unified CMV injection module 400 without the first CMV injection module 402. The first CMV injection module 402 is configured to inject a first CMV signal 406 which is used to modify at least one command signal or modulation signal 422 to achieve at least one first function in association with the operation of the power conversion system 100. In one embodiment, the at least one command signal 422 includes three-phase voltage commands which are generated by transforming voltage commands 416 from d-q domain into three-phase domain using a transformation unit 418. In one specific embodiment, the first CMV injection module 402 may be configured to generate the first CMV signal 406 through min-max calculation. More specifically, the first CMV injection module 402 may be configured to generate the first CMV signal 406 using the following equation:

$$u_0 = \frac{\max(u_{dm,a,b,c}) + \min(u_{dm,a,b,c})}{2}, \quad (1)$$

where $u_0$ is the first CMV signal, $\max(u_{dm,a,b,c})$ represents an instantaneous maximum voltage identified from three-phase voltages, and $\min(u_{dm,a,b,c})$ represents instantaneous minimum voltage identified from three-phase voltages. In other embodiments, the first CMV injection module 402 may be configured to generate a pure third-order harmonic signal which has three times fundamental frequency. Injecting the first CMV signal 406 through min-max calculation or having pure third-order harmonic signal can increase the DC voltage utilization and reduce the total harmonic distortion at the output of the second power converter 126. The first CMV signal 406 is combined with the each of three-phase voltage commands 422 at a first summation element 412 which provides first modified three-phase voltage commands 424 accordingly.

Figure 7:
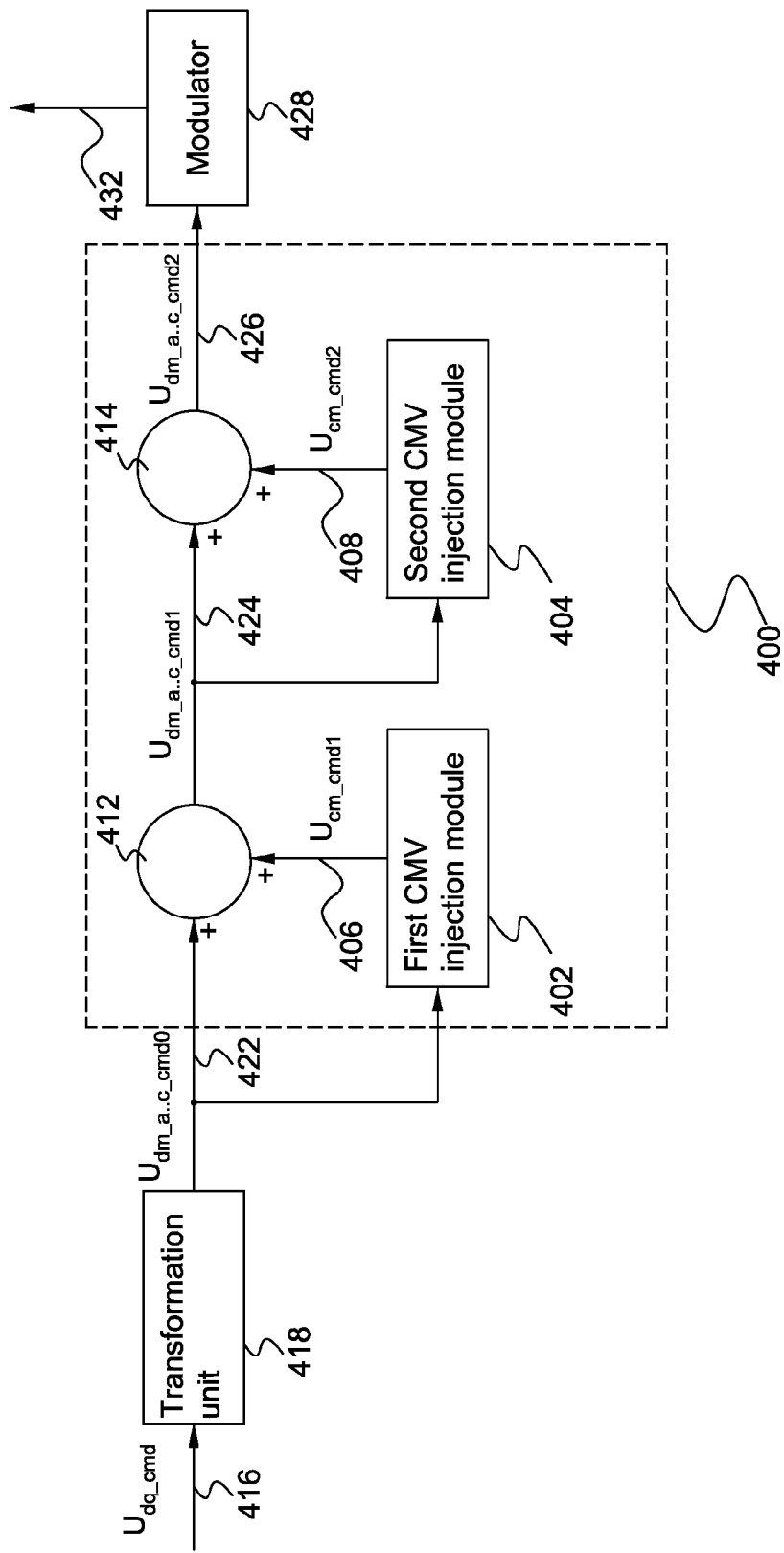
FIG. 7 is a block diagram of an unified common mode voltage injection module in accordance with another exemplary embodiment of the present disclosure.
Figure 8:
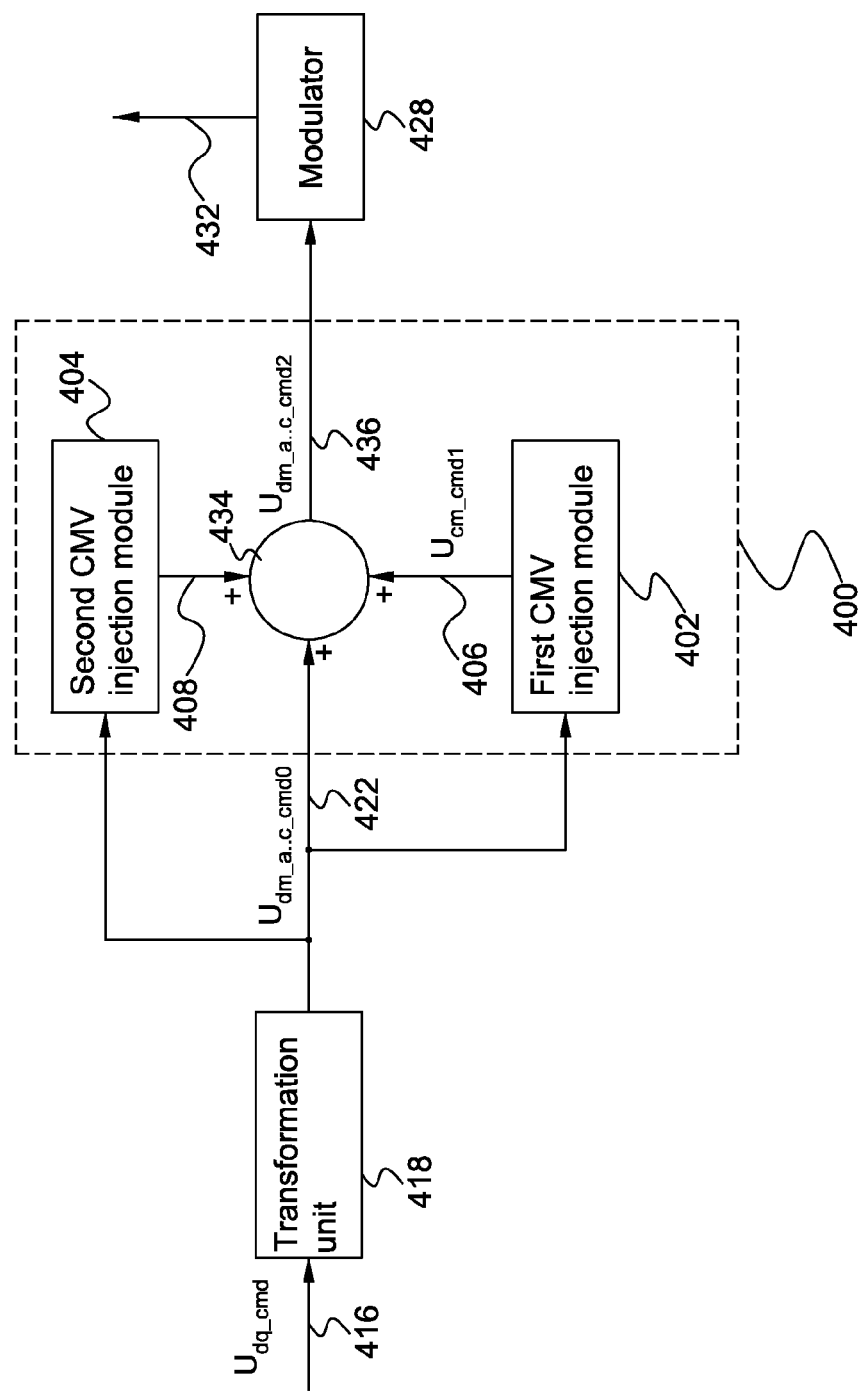
FIG. 8 is a block diagram of an unified common mode voltage injection module in accordance with another exemplary embodiment of the present disclosure.

Further referring to FIG. 6, in one embodiment, the second CMV injection module 404 is configured to generate a second CMV signal 408 which is used to modify one or more command signals to achieve at least one second function in association with the operation of the power conversion system 100. In the illustrated embodiment, the second CMV signal 408 is generated according to the three-phase voltage commands 422 provided from the transformation unit 418. In other embodiments, for example, as shown in FIG. 7, the second CMV signal 408 may be generated according to the first modified three-phase voltage commands 424 provided from the first summation element 412. In the illustrated embodiment of FIG. 6, the second CMV signal 408 is supplied to a second summation unit 414 which combines the second CMV signal 408 with the first modified three-phase voltage commands 424 and provides second modified voltage commands 426. In other embodiments, the second CMV signal 408 may be directly used to modify the three-phase voltage commands 422 provided from the transformation unit 418. For example, as shown in FIG. 8, the second CMV signal 408 and the first CMV signal 406 are commonly supplied to a summation unit 434 which combines the first, second CMV signals 406, 408 with the three-phase voltage commands 422 and provides modified command signals 436 accordingly. In the illustrated embodiment of FIG. 6, the second modified voltage commands 426 are supplied to a modulator 428 which is configured to generate control signals 432 for turning on and off the various switching devices in the second converter 126 to allow the at least one first function and the at least one second function to be achieved.

Figure 9:
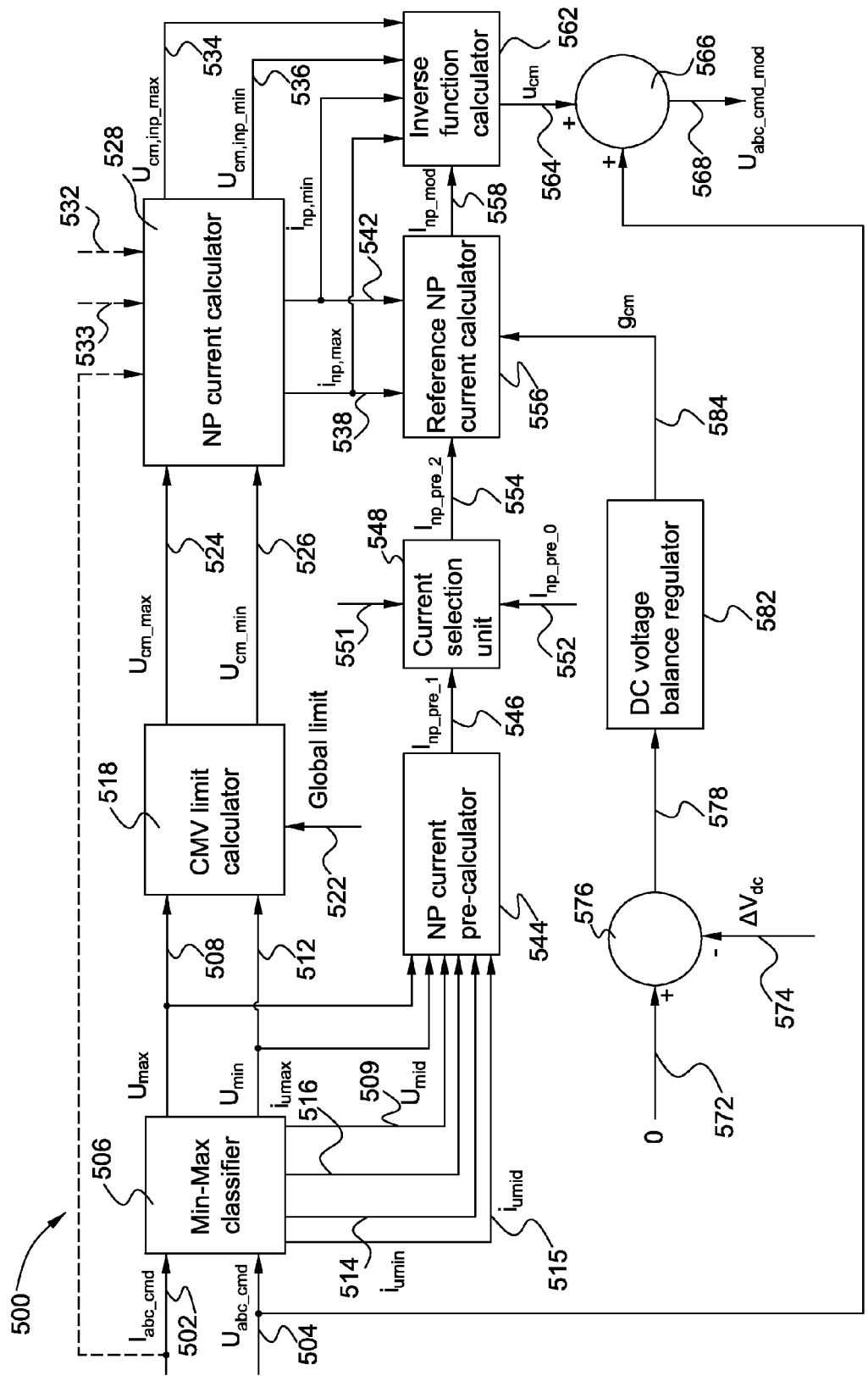
FIG. 9 is a block diagram illustrating detailed structures of a second CMV injection module shown in FIGS. 6-8 in accordance with one exemplary embodiment of the present disclosure.

FIG. 9 is a block diagram illustrating detailed structures of a CMV injection module 500 in accordance with one exemplary embodiment of the present disclosure. The CMV injection module 500 may be implemented as the second CMV module 404 shown in FIGS. 6-7 for making further modification to the one or more voltage commands 424 that has been modified by the first CMV signal 406. In some embodiments, the CMV injection module 500 can be independently implemented as the second CMV module 404 shown in FIG. 8 to directly modify the one or more voltage commands 422 to achieve at least a second function such as DC-link voltage balancing.

In the illustrated embodiment of FIG. 9, the CMV injection module 500 includes a min-max classifier 506, a CMV limit calculator 518, a neutral point (NP) current calculator 528, a NP current pre-calculator 544, a reference NP current calculator 556, an inverse function calculator 562, and a DC voltage balance regulator 582.

In one embodiment, the min-max classifier 506 is configured to receive voltage commands such as three-phase voltage commands 504. The min-max classifier 506 is further configured to identify a maximum voltage command 508 and a minimum voltage command 512 at any instant from the three-phase voltage commands 504. In some embodiments, the min-max classifier 506 may be further configured to identify a medium voltage command 509 at any instant from the three-phase voltage commands 504. The same min-max classifier 506, or in some embodiments a different min-max classifier may be configured to receive three-phase current commands 502 and identify a maximum current command 516 and a minimum current command 514 at any instant from the three-phase current commands 502. In some embodiments, the same min-max classifier 506, or in some embodiments a different min-max classifier may be used to identify a medium current command 515 from the three-phase current commands 502.

The instantaneous maximum voltage 508 and the instantaneous minimum voltage 512 are supplied to the CMV limit calculator 518 which is configured to calculate a maximum CMV limit 524 and a minimum CMV limit 526 according to one or more criteria. In one particular embodiment, the CMV limit calculator 518 generates the maximum and minimum CMV limits 524, 526 according to one or more global limit signals 522, for example one or more DC voltages measured from the DC link 124. The maximum CMV limit 524 is set to ensure that the modified voltage command signal does not touch or exceed an upper DC voltage, and the minimum CMV limit 526 is to ensure that the modified voltage command signal does not touch or fall below a lower DC voltage. In some embodiments, either or both the maximum and minimum CMV limits 524, 526 are set to ensure the one or more voltage commands after CMV injection does not change signs (e.g., from positive to negative or from negative to positive).

In one embodiment, the maximum CMV limit 524 and the minimum CMV limit 526 are supplied to the NP current calculator 528 which is configured to calculate NP current signals after CMV injection based at least in part on the maximum and minimum CMV limits 524, 526. The calculation could be done online or offline. In some embodiments, the NP current calculator 528 may calculate the maximum and minimum NP current limits 538, 542 in a numerical manner. For example, the NP current calculator 528 calculates all NP current signals for all possible CM voltages defined between the maximum CM limit 524 and the minimum limit 526. Then, a maximum NP current limit 538 and a minimum NP current limit 542 can be identified by scanning all the calculated NP current signals. Also, a first CM voltage 534 corresponding to the maximum NP current 538 and a second CM voltage 536 corresponding to the minimum NP current 542 can be obtained.

In other embodiments, the NP current calculator 528 may calculate the maximum NP current 538 and the minimum NP current 542 in an analytical manner. For example, one or more linear equations may be used for calculation of the maximum and minimum NP current signals 538, 542. In one embodiment, the maximum and minimum NP current limits 538, 542 are calculated based at least in part on the maximum CM limit 524, the minimum CM limit 526, and three-phase current commands 502. In other embodiments, instead of using the three-phase current commands 502 for calculation, the NP current calculator 528 may calculate the maximum NP current 538 and the minimum NP current 542 based at least in part on the maximum CM limit 524, the minimum CM limit 526, and three-phase feedback current signals 532 (shown in dashed line) measured with one or more current sensors at the output of the second converter 126.

In some embodiments, the NP current calculator 528 may be optionally configured to generate the maximum and minimum NP current limits 538, 542 and the corresponding first and second CM voltage signals 534, 536 based at least in part on one or more switching state signals 533 (shown in dashed line). In some cases, for a particular maximum or minimum NP current limit, there may exist two or more common mode voltages, and each common mode voltage may correspond to a particular switching state. As used herein, "switching state" refers to ON and/or OFF states of all the switching devices in a power converter at one instant. In view of this switching state redundancy, one of the two or more common mode voltages can be generated according to a desired switching state that the power converter should be operated with to achieve certain functions such as reducing the voltage stress on flying capacitors.

Further referring to FIG. 9, the maximum NP current limit 538 and the minimum NP current limit 542 are supplied to the reference NP current calculator 556 which is configured to calculate a reference NP current 558 based at least in part on an original NP current 554, a gain signal 584, and the maximum and minimum current limit signals 538, 542. The reference NP current 558 represents a desired current flowing to or from the neutral point 252 at the DC link 270. In one embodiment, the original NP current 554 is provided from a current selection unit 548 which selects one of a first original current signal 546 and a second original NP current signal 552 depending on different NP current regulation modes that the power conversion system 100 should be operated with. More specifically, when it is desired to operate the power conversion system 100 under a first NP current regulation mode in which the third-order harmonic current present at the neutral point 252 of the DC link 270 should be kept, the current selection unit 548 may be operated according to a mode selection signal 551 to allow the first original NP current 546 to be supplied to the reference NP current calculator 562. On the other hand, when it is desired to operate the power conversion system 100 under a second NP current regulation mode in which the third-order harmonic current fluctuations at the neutral point 252 of the DC link 270 should be reduced or removed, the current selection unit 548 may be operated according to an updated mode selection signal 551 to allow the second original NP current 552 (e.g., zero current signal) to be supplied to the reference NP current calculator 562.

In one embodiment, the first original NP current 546 is calculated by the NP current pre-calculator 544 based at least in part on the instantaneous maximum, medium, and minimum voltage commands 508, 509, 512 and instantaneous maximum, medium, and minimum current commands 516, 515, 514. More specifically, in one embodiment, the NP current pre-calculator 544 may calculates the first original NP current 546 using the following equation:

$$i_{np,org} = \begin{cases} \dfrac{u_{max}}{u_{DCP}} i_{umax} + \dfrac{u_{min}}{u_{DCM}} i_{umin} + \dfrac{u_{mid}}{u_{DCP}} i_{umid} \text{ for } u_{mid} \geq 0 \\ \dfrac{u_{max}}{u_{DCP}} i_{umax} + \dfrac{u_{min}}{u_{DCM}} i_{umin} + \dfrac{u_{mid}}{u_{DCM}} i_{umid} \text{ for } u_{mid} < 0 \end{cases}, \quad (2)$$

where $i_{np,org}$ is the first original NP current, $u_{max}$, $u_{mid}$, $u_{min}$ are the instantaneous maximum, medium, and minimum voltages, respectively, $i_{umax}$, $i_{umid}$, $i_{umin}$ are the instantaneous maximum, medium, and minimum current, respectively, $u_{DCP}$ is the DC voltage at the first capacitor of the DC link, $u_{DCM}$ is the DC voltage at the second capacitor of the DC link.

In one embodiment, the gain signal 584 is generated from a DC voltage balance regulator 582 which may be a proportional-integral (PI) regulator for example. The DC voltage balance regulator 582 receives a voltage error signal 578 which is generated from a summation element 576 by subtracting a DC voltage difference signal 574 from a zero DC voltage command signal 572. The DC voltage difference signal 574 represents a voltage difference between the first capacitor 242 and the second capacitor 244 of the DC link 270. The zero DC voltage command signal 572 is set to indicate that the desired DC voltage difference between the two capacitors should be zero.

Further referring to FIG. 9, in one embodiment, when the power converter is operated under a first NP regulation mode, in which the third-order harmonic current should be kept, the reference NP current calculator 556 is configured to generate the reference NP current signal 558 using the following equation:

$$i_{np,mod} = \begin{cases} i_{np,org}(1-g) + i_{np,max} \cdot g & \text{for } g > 0 \\ i_{np,org} & \text{for } g = 0 \\ i_{np,org}(1+g) + i_{np,min} \cdot |g| & \text{for } g < 0 \end{cases} \quad (3)$$

where $i_{np,mod}$ is the reference NP current signal, $i_{np,org}$ is the first original NP current signal, g is the gain signal, $i_{np,max}$ is the maximum NP current limit, and $i_{np,min}$ is the minimum NP current limit.

In another embodiment, when the power converter is operated under a second NP current regulation mode, in which the AC unbalance present at the neutral point of the DC link should be reduced to eliminate the third-order harmonic current fluctuations, the reference NP current calculator 556 may be configured to calculate the reference NP current signal 558 using the following equation:

$$i_{np,mod} = \begin{cases} i^*_{np,org}(1-g) + i_{np,max} \cdot g & \text{for } g > 0 \\ i^*_{np,org} & \text{for } g = 0 \\ i^*_{np,org}(1+g) + i_{np,min} \cdot |g| & \text{for } g < 0 \end{cases} \quad (4)$$

where $i_{np,mod}$ is the reference NP current signal, $i_{np,org}$* is the second original NP current signal, g is the gain signal, $i_{np,max}$ is the maximum NP current limit, and $i_{np,min}$ is the minimum NP current limit.

With continuing reference to FIG. 9, the reference NP current signal 558 calculated with the reference NP current calculator 556 is further supplied to the inverse function calculator 562. The inverse function calculator 562 is configured to calculate the CMV signal 564 based at least in part on the reference NP current signal 558, maximum and minimum NP current limits 538, 542, and the first and second CMV voltage 534, 536 corresponding to the maximum and minimum NP current limits 538, 542. In one embodiment, the inverse function calculator 562 may use one or more linear equations defined between the neutral point current and the common mode voltage for calculation of the desired CMV signal. In other embodiments, the inverse function calculator 562 may obtain the CMV signal be referring to a lookup table. The CMV signal 564 is supplied to a summation element 566 which provides one or more modified voltage command signals or modulation signals 568 by combining the CMV signal 564 with the one or more voltage command signals 504. The one or more modified voltage command signals or modulation signals 568 are supplied to the modulator 428 shown in FIGS. 6-8 to achieve the function of balancing the DC voltages at the DC capacitors 242, 244 of the DC link 270.

Figure 10:
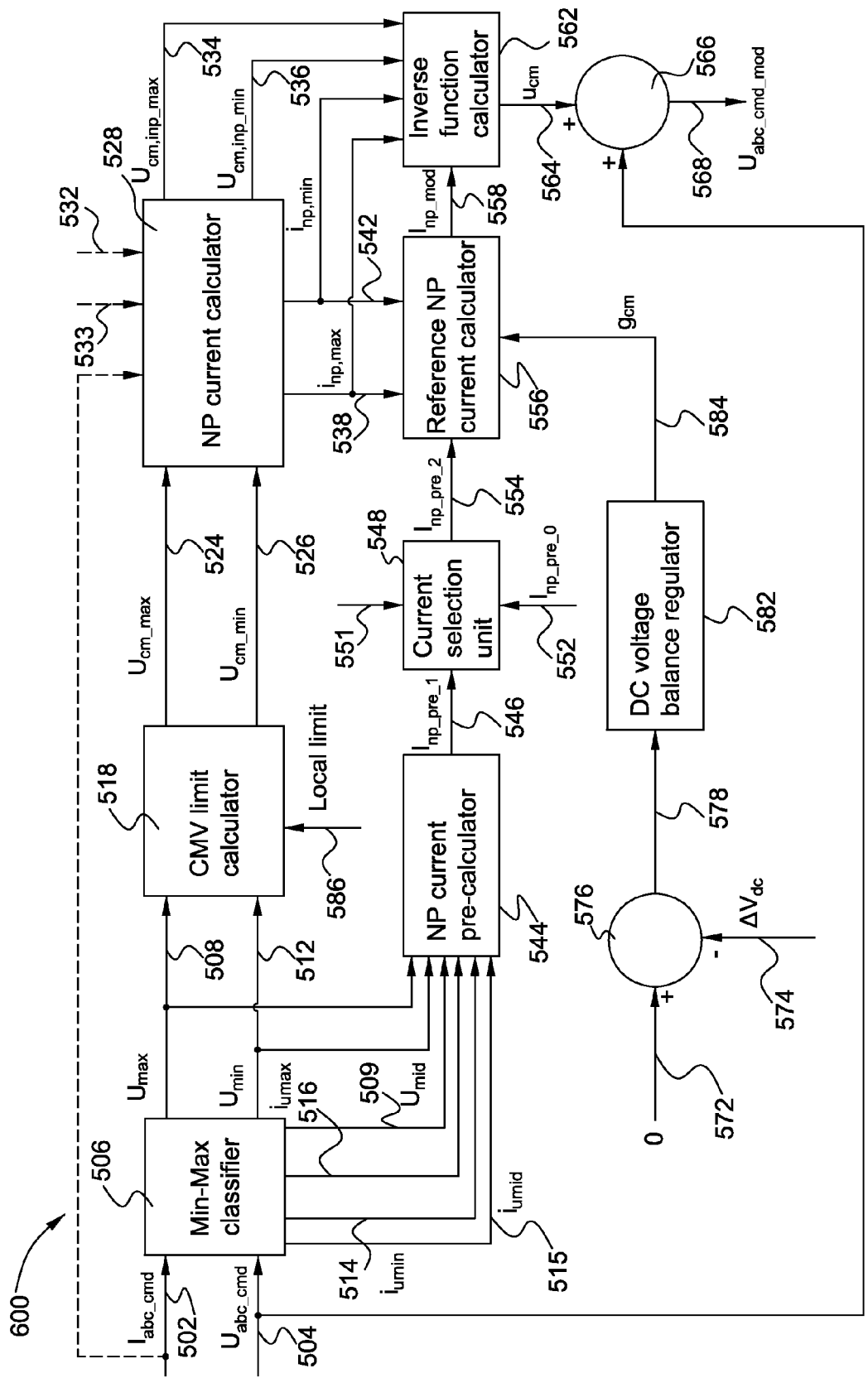
FIG. 10 is a block diagram illustrating detailed structures of the second CMV injection module shown in FIGS. 6-8 in accordance with another exemplary embodiment of the present disclosure.
Figure 11:
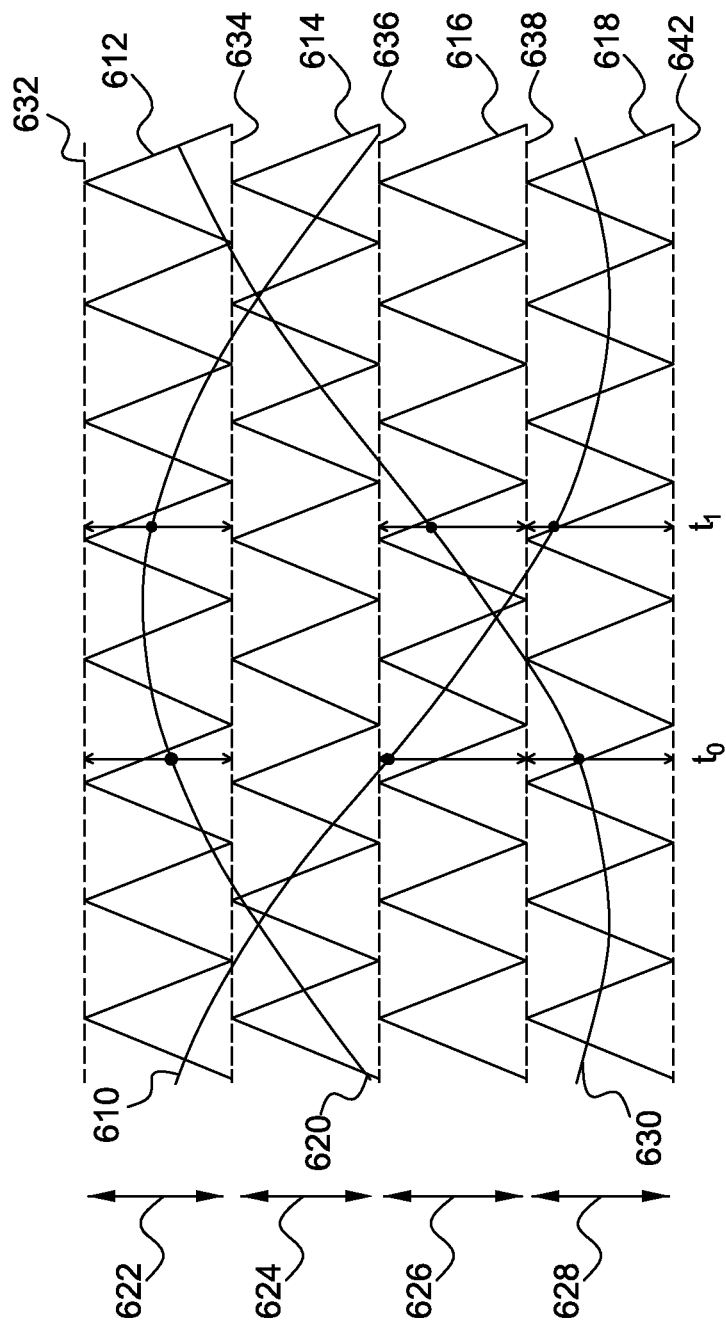
FIG. 11 illustrates local limits that may be taken into consideration in modifying the modulation waveforms by injecting a common mode voltage in accordance with an exemplary embodiment of the present disclosure.

FIG. 10 is a block diagram illustrating detailed structures of a second CMV injection module 600 in accordance with another exemplary embodiment of the present disclosure. The second CMV injection module 600 can also be implemented as the second CMV injection module 404 shown in FIGS. 6-8 to achieve multiple functions in association with the operation of the power conversion system 100. The CMV injection module 600 shown in FIG. 10 is substantially similar to the CMV injection module shown in FIG. 9, thus similar elements of the CMV injection module 600 shown in FIG. 10 as those shown in FIG. 9 will not be described in detail. One of the differences of the CMV injection module 600 shown in FIG. 10 is that the CMV limit calculator 518 is optionally or additionally configured to calculate the maximum CMV limit 524 and the minimum CMV limit 526 based at least in part on one or more local limits 586. In one embodiment, the one or more local limits 586 may include a carrier band voltage. As shown in FIG. 11, a first carrier wave signal 612 is located within a first carrier band voltage 622 defined by a first voltage level 632 and a second voltage level 634, a second carrier wave signal 614 is located within a second carrier band voltage 624 defined by the second voltage level 634 and a third voltage level 636, a third carrier wave signal 616 is located within a third carrier band voltage 626 defined by the third voltage level 636 and a fourth voltage level 638, and a fourth carrier wave signal 618 is located within a fourth carrier band voltage 628 defined by the fourth voltage level 638 and a fifth voltage level 642. At a first instant $t_0$, the local limit 586 is set to ensure the three-phase voltage modulation signals 610, 620, 630 modified by the CMV signal will fall within the respective first, third, fourth carrier band voltages 622, 626, 628. Similarly, at second instant $t_1$ the local limit 586 is set to ensure the three-phase voltage modulation signals 610 modified by the CMV signal fall within the respective carrier band voltages 622, 626, and 628.

Further referring to FIG. 10, in some embodiments, applying the local limits to three-phase voltage commands at any instant may generate three different maximum CMV limits and three different minimum CMV limits. In this case, the maximum CMV limit 524 may be the one that is a minimum of the three different maximum CMV limits, and the minimum CMV limit 526 is the one that is a maximum of the three different minimum CMV limits. It can be understood that using the local limits such as carrier band voltage to generate the maximum and minimum CMV limits can avoid the creation of additional switching patterns and transients. As a result, control complexity of the controller for controlling the switching of the power converters can be reduced. In addition, switching loss can be reduced by keeping the one or more command voltages or modulation voltages after CMV injection within their original carrier band voltages.

Figure 12:
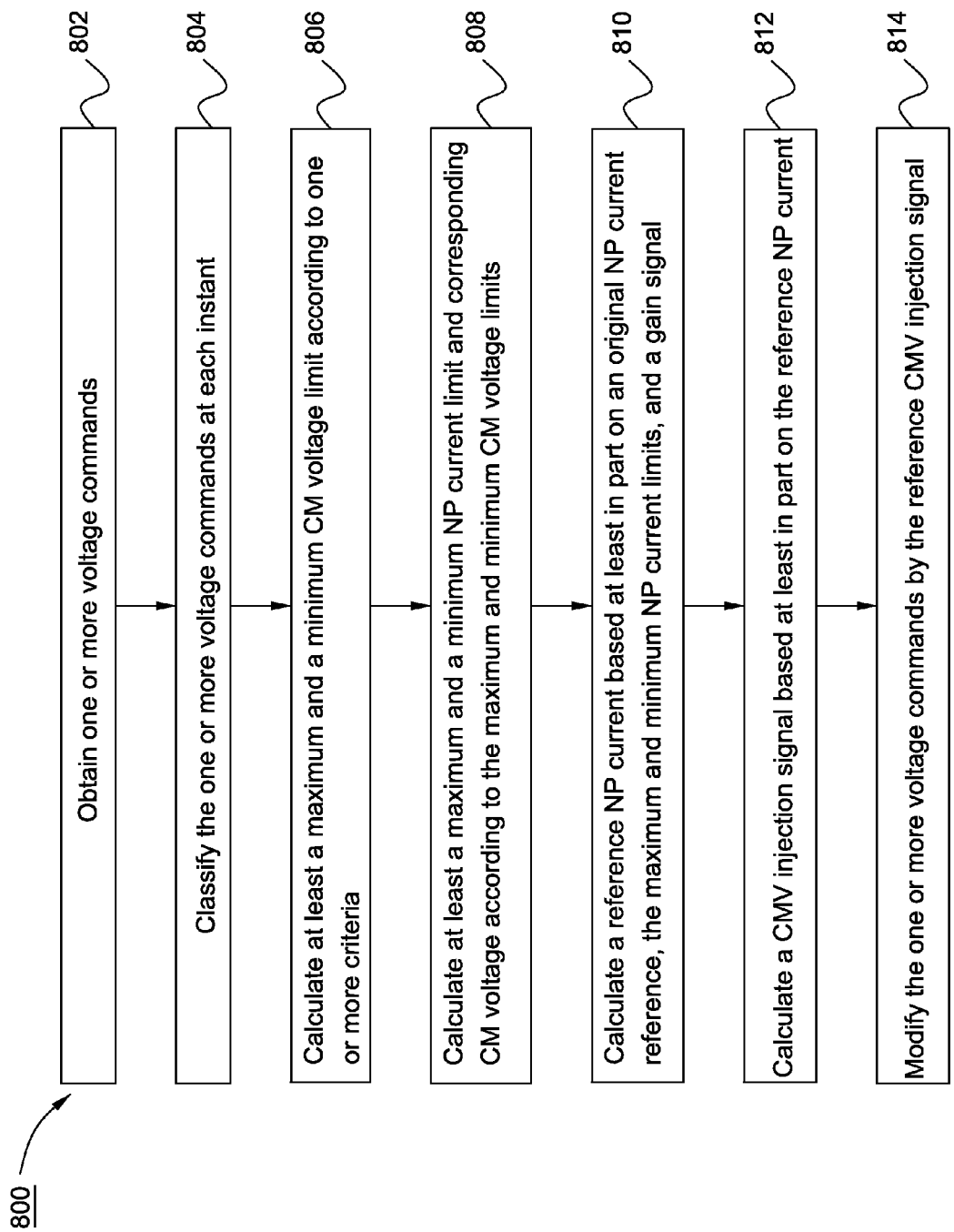
FIG. 12 is a flowchart illustrating a unified common mode voltage injection method in accordance with one exemplary embodiment of the present disclosure.

FIG. 12 is a flowchart illustrating a common mode voltage injection method 800 in accordance with one exemplary embodiment of the present disclosure. The CMV injection method 800 may be independently implemented by the second CMV injection module 404 shown in FIGS. 6-8 to achieve at least one function of balancing DC voltage present at a DC link of the power conversion system 100. The common mode voltage injection method 800 may also be implemented in combination with the first CMV injection module 402 to achieve multiple functions in association with the operation of the power conversion system 100. At least some of the blocks/actions illustrated in method 800 may be programmed with software instructions stored in a computer-readable storage medium. The computer-readable storage medium may include volatile and nonvolatile, removable and non-removable media implemented in any method or technology. The computer-readable storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by one or more processors.

In one embodiment, the method 800 may include a block 802, in which one or more voltage commands such as three-phase AC voltage commands are obtained. In one embodiment, the one or more voltage commands or the three-phase AC voltage commands may be obtained from one or more upper level controllers by implementing one or more algorithms to achieve a desired AC voltage at the output of the power converter. In one embodiment, the one or more voltage commands may be signals that are free of CMV injection. In other embodiments, the one or more voltage commands may have already been modified by a first CMV signal which may be generated through min-max calculation or has pure third-order harmonic signal as described above with reference to FIG. 6.

At block 804, the method 800 continues to classify the obtained one or more voltage commands. For example, a min-max classifier 506 (see FIG. 9) may be used to identify at least a maximum value and a minimum value from the one or more voltage commands at each instantaneous time. In some embodiments, a medium voltage may also be identified using the min-max classifier 506.

At block 806, the method 800 continues to calculate a maximum CM voltage limit and a minimum CM voltage limit based at least in part on the instantaneous maximum and minimum voltage commands using one or more criteria. In one embodiment, the one or more criteria may include one or more global limits such as one or more DC link voltage limits. More specifically, in some embodiments, the maximum CM voltage limit is generated to ensure that the one or more voltage commands modified by the CMV injection signal will not exceed an upper DC link voltage. Similarly, the minimum CM voltage is generated to ensure the one or more voltage commands modified by the CMV injection signal will not exceed a lower DC link voltage. In some embodiments, the maximum or minimum CM voltage limits are generated in a manner that the one or more voltage commands after CMV injection signal doesn't change signs.

In other embodiments, at block 806, the one or more criteria may include one or more local limits such as one or more carrier band voltages. In this case, the maximum CM voltage limit and the minimum CMV limits are generated to ensure that the one or more command voltages after CMV injection do not jump from one carrier band voltage to another carrier band voltage. Therefore, additional switching patterns and/or transients can be avoided, and control complexity and switching loss can be reduced.

At block 808, the method 800 continues to calculate NP current signals after CMV injection based on the maximum CMV limit and the minimum CMV limits. The calculation of the NP current signals can be done in analytical and/or numerical manners. In some embodiments, the calculated NP current signals are scanned to find out the maximum and minimum NP current limits and CM voltages corresponding to the maximum and minimum NP current limits. In some embodiments, redundancy switching states may be taken into consideration in generation of the maximum and minimum NP current limits so as to achieve certain functions such as reducing voltage stress on flying capacitors of the power converter.

At block 810, the method 800 continues to calculate a reference NP current based at least in part on an original NP current, the maximum and minimum NP current limits, and a gain signal. In some embodiments, the calculation of the reference NP current depends on a desired current pattern present at a neutral point of the DC link. For example, when the power conversion system is operated under a first NP current regulation mode, in which the original AC unbalance at the neutral point of the DC link should be kept. In this case, the original NP current may include a third-order harmonic current signal. Maintaining the AC unbalance at the neutral point can allow applying smaller common mode voltage at equal NP current level. In addition, a big change of the PWM pattern can be avoided, such that THD of the output AC voltage can be minimized. In some embodiments, when the power conversion system is operated under a second NP current regulation mode, in which the AC unbalance should be removed or reduced. In this case, the original NP current may be set to be zero. The gain signal is generated by a DC link voltage balance controller by regulating input signals representing voltage difference between at least two DC capacitors of the DC link.

At block 812, the method 800 continues to calculate a CMV injection signal based at least in part on the calculated reference NP current. In one embodiment, a reverse function such as one or more linear functions of the CM voltage in terms of NP current can be derived for calculation of the CMV injection signals. In some embodiments, a lookup table may be used to find the CMV injection signal corresponding to the reference NP current.

At block 814, the one or more voltage commands obtained at block 802 is modified by combining the reference CMV injection signal with the one or more voltage commands. In some embodiments, the modified one or more voltage commands are supplied to a modulator for generating control signals used to turn on and/or off the various switching devices in the power converter. Therefore, the voltage difference at the DC link can be minimized by injecting the CMV signals to the one or more voltage commands or modulation signals.

The method 800 described above with reference to FIG. 12 may be modified in a variety of ways. For example, in some embodiments, the method 800 may include additional one or more blocks/actions. For example, the method 800 may include blocks for obtaining one or more current commands which are used to calculate the original NP current at the neutral point of the DC link. The method 800 may also include blocks for identifying at least an instantaneous maximum value and an instantaneous minimum value from one or more current commands.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A power conversion system, comprising: at least one multi-level power converter; and a controller coupled to the at least one multi-level power converter, the controller comprising: a first common mode voltage (CMV) injection module for generating a first CMV signal for modifying at least one voltage command to achieve a first function in association with operation of the power conversion system; a second CMV injection module for generating a second CMV signal based at least in part on a local limit either for modifying the at least one voltage command or for further modifying the at least one modified voltage command to achieve a second function in association with operation of the power conversion system; and a summation unit to receive and combine the first CMV signal and the second CMV signal with the at least one voltage command to provide modified voltage command signals.

2. The power conversion system of claim 1, wherein the first CMV signal is generated based at least in part on an instantaneous maximum voltage and an instantaneous minimum voltage identified from a plurality of voltage commands.

3. The power conversion system of claim 1, further comprising a direct current (DC) link coupled to the at least one multi-level converter, the DC link comprising at least two DC capacitors defining at least one DC neutral point therebetween, wherein the second CMV signal is used to modify the at least one voltage command to regulate the DC current component flowing from or to the DC neutral point of the DC link in order to reduce the voltage difference between two the DC capacitors substantially to zero.

4. The power conversion system of claim 3, wherein the second CMV signal is further used to modify the at least one voltage command to regulate the AC current component flowing from or to the DC neutral point of the DC link in order to substantially reduce the voltage difference between the two capacitors to zero.

5. The power conversion system of claim 1, wherein the second CMV injection module comprises a min-max classifier for determining an instantaneous maximum and an instantaneous minimum voltage from three-phase AC voltage command signals.

6. The power conversion system of claim 5, wherein the second CMV injection module comprises a CMV limit calculator for calculating a maximum CMV limit and a minimum CMV limit based at least in part on measured DC voltages at a DC link.

7. The power conversion system of claim 5, wherein the second CMV injection module comprises a CMV limit calculator for calculating a maximum CMV limit and a minimum CMV limit based at least in part on a carrier band voltage.

8. The power conversion system of claim 5, wherein the second CMV injection module comprises a CMV limit calculator for calculating a maximum CMV limit and a minimum CMV limit based at least in part on a minimum pulse width requirement of the PWM.

9. The power conversion system of claim 6, wherein the second CMV injection module further comprises a NP current calculator for calculating a maximum neutral point current, a minimum neutral point current, a first CMV corresponding to the maximum neutral point current, and a second CMV corresponding to the minimum neutral point current based at least in part on the maximum CMV limit, the minimum CMV limit, and three-phase AC current command or feedback signals.

10. The power conversion system of claim 6, wherein the CMV injection module further comprises a NP current calculator for calculating a maximum neutral point current, a minimum neutral point current, a first CMV corresponding to the maximum neutral point current, and a second CMV corresponding to the minimum neutral point current based at least in part on the switching state of the converter at each instantaneous time.

11. The power conversion system of claim 9, wherein the second CMV injection module further comprises a reference NP current calculator for calculating a neutral point reference current based at least in part on the maximum neutral point current, minimum neutral point current, and a gain signal.

12. The power conversion system of claim 11, wherein the second CMV injection module further comprises an inverse function calculator for calculating the second CMV signal based at least in part on the maximum neutral point current, the minimum neutral point current, the first CMV corresponding to the maximum neutral point current, the second CMV corresponding to the minimum neutral point current, and the neutral point reference current.

13. The power conversion system of claim 11, wherein the second CMV injection module further comprises a DC voltage balance regulator for generating the gain signal based at least in part on a DC voltage difference signal at the DC link.

14. The power conversion system of claim 11, wherein the second CMV injection module further comprises a NP current pre-calculator for calculating an original neutral point current flowing from or to the DC neutral point based at least in part on the instantaneous maximum, medium, and minimum voltage signals, the instantaneous maximum, medium, and minimum current signals, and wherein the original neutral point current is used for generating the neutral point reference current.

15. A method for operating a power conversion system having a multi-level converter and a controller coupled thereto, the method comprising: generating a first common mode voltage (CMV) injection signal; using the first CMV injection signal to modify at least one voltage command to achieve a first function in association with operation of the power conversion system; generating a second CMV signal based at least in part on a local limit; using the second CMV signal either to modify the at least one voltage command or to further modify the at least one modified voltage command to achieve a second control function in association with operation of the power conversion system; and combining the first CMV signal and the second CMV signal with the at least one voltage command to provide modified voltage command signals.

16. The method of claim 15, wherein generating the second CMV signal comprises:
   determining an instantaneous maximum voltage and an instantaneous minimum voltage based at least in part on a plurality of voltage command signals;
   calculating a maximum CMV limit and a minimum CMV limit based at least in part on a global limit and the local limit;
   calculating a neutral point maximum current, a neutral point minimum current, a first CMV corresponding to the neutral point maximum current, and a second CMV corresponding to the neutral point minimum current based at least in part on the maximum CMV limit, the minimum CMV limit, a plurality of instantaneous current command signals, and the switching state of a converter circuit; and
   calculating the second CMV signal based at least in part on the neutral point maximum current, the neutral point minimum current, the first CMV corresponding to the neutral point maximum current, the second CMV corresponding to the neutral point minimum current, and a neutral point reference current.

17. The method of claim 15, further comprising:
   generating a gain signal based at least in part on a DC voltage difference signal at a DC link; and
   calculating the neutral point reference current based at least in part on the maximum neutral point current, minimum neutral point current, the original neutral point current and the gain signal.

18. The method of claim 17, further comprising:
   calculating an original neutral point current flowing from or to the DC neutral point based at least in part on the instantaneous maximum, medium, and minimum voltage signals, the instantaneous maximum, medium, and minimum current signals; and
   generating the neutral point reference current by selectively using the original neutral point current according to at least one desired current pattern present at the neutral point of the DC link.

19. A power conversion system, comprising: a direct current (DC) link comprising at least a first DC part and a second DC part; at least one multi-level power converter coupled to the DC link; a controller coupled to the at least one multi-level power converter, the controller comprising a common mode voltage (CMV) injection module configured for generating a first CMV signal and a second CMV signal for modifying at least one voltage command to balance DC voltages at the first DC part and the second DC part, and a summation unit to receive and combine the first CMV signal and the second CMV signal with the at least one voltage command to provide modified voltage command signals; wherein the CMV injection module provides at least one of a maximum and minimum CMV limit signal for limiting the magnitude of the CMV signal based at least in part on a local limit.

20. The power conversion system of claim 19, wherein the local limit comprises a carrier band voltage.

* * * * *